(12) United States Patent
Koustubhan et al.

(10) Patent No.: US 11,702,209 B2
(45) Date of Patent: Jul. 18, 2023

(54) AIRCRAFT PASSENGER SEAT WITH IN-FLIGHT ROCKING MOTION

(71) Applicant: B/E Aerospace, Inc., Winston-Salem, NC (US)

(72) Inventors: Arjun Koustubhan, Hyderabad (IN); Arvind Mahabaleshwara, Hyderabad (IN); Rajesh Mohanam, Hyderabad (IN)

(73) Assignee: B/E Aerospace, Inc., Winston-Salem, NC (US)

(\*) Notice: Subject to any disclaimer, the term of this patent is extended or adjusted under 35 U.S.C. 154(b) by 971 days.

(21) Appl. No.: 16/451,577

(22) Filed: Jun. 25, 2019

(65) Prior Publication Data

US 2020/0407067 A1    Dec. 31, 2020

(51) Int. Cl.
*B64D 11/06*    (2006.01)
*B60N 2/04*     (2006.01)
*A47C 3/02*     (2006.01)

(52) U.S. Cl.
CPC ............ *B64D 11/0639* (2014.12); *B60N 2/04* (2013.01); *A47C 3/02* (2013.01)

(58) Field of Classification Search
CPC .............. B64D 11/0639; B64D 11/064; B64D 11/0648; B60N 2/02; B60N 2/04; B60N 2/10; A47C 3/02; A47C 3/0257; A47C 3/027
See application file for complete search history.

(56) References Cited

U.S. PATENT DOCUMENTS

| | | | |
|---|---|---|---|
| 2,299,538 A * | 10/1942 | Goldstein | A47C 3/0257 297/261.1 |
| 3,572,829 A | 3/1971 | Malitte | |
| 3,819,229 A | 6/1974 | Rogers, Jr. et al. | |
| 5,992,798 A * | 11/1999 | Ferry | B60N 2/34 105/316 |
| 7,021,711 B1 | 4/2006 | Hoffman et al. | |

(Continued)

FOREIGN PATENT DOCUMENTS

| | | |
|---|---|---|
| EP | 3060473 A1 | 8/2016 |
| WO | 2016149510 A1 | 9/2016 |

OTHER PUBLICATIONS

EP Search Report for European Application No. 19216119.8 dated Jul. 21, 2020, 8 pages.

*Primary Examiner* — Michael H Wang
(74) *Attorney, Agent, or Firm* — Suiter Swantz pc llo (57) ABSTRACT

An aircraft passenger seat construction capable of in-flight rocking motion and berthing, wherein rocking motion and berthing are mutually exclusive features. The seat construction includes a fixed frame including spaced frame members each having a support surface to be rocked on, a rocking frame including a seat pan and spaced rockers, the spaced rockers positioned to rock on the support surfaces, guides carried on the spaced rockers engaged to travel within guide slots of the spaced frame members, a backrest pivotally attached to the rocking frame, and a leg rest pivotally attached to the rocking frame. The rocking frame may rock back-and-forth in-flight or may be locked at any given position based on passenger preference. The seat construction is compatible with or without other seat adjustment mechanisms such as tracking, swivel, lie-flat and recline adjustment mechanisms.

18 Claims, 7 Drawing Sheets

(56) References Cited

U.S. PATENT DOCUMENTS

| | | | |
|---|---|---|---|
| 8,967,718 B2* | 3/2015 | Hoffman | A47C 1/03272 |
| | | | 297/341 |
| 9,511,865 B2* | 12/2016 | Thomaschewski | ............ |
| | | | B60N 2/42736 |
| 9,730,518 B1* | 8/2017 | Jacobs | A47C 7/70 |
| 2005/0253436 A1* | 11/2005 | Dowty | B64D 11/0636 |
| | | | 297/344.1 |
| 2006/0061163 A1 | 3/2006 | Wang et al. | |
| 2006/0273631 A1 | 12/2006 | White et al. | |
| 2008/0100121 A1* | 5/2008 | Serber | A47C 9/002 |
| | | | 297/452.1 |
| 2010/0201172 A1 | 8/2010 | Hudswell et al. | |
| 2011/0233972 A1 | 9/2011 | Weicek | |
| 2012/0146364 A1 | 6/2012 | Hoffman et al. | |
| 2015/0151840 A1* | 6/2015 | Thomaschewski | ............ |
| | | | B60N 2/42736 |
| | | | 297/216.19 |
| 2022/0063463 A1* | 3/2022 | Oyama | B60N 2/0244 |

* cited by examiner

FIG. 7

AIRCRAFT PASSENGER SEAT WITH IN-FLIGHT ROCKING MOTION

BACKGROUND

Vehicle seats are typically adjustable for passenger comfort. In aircraft, adjustability may vary based on aircraft type and seating class. Seats in economy seating classes are typically limited to shallow backrest recline with at most a corresponding minimal change in seat pan angle. Seats in premium seating classes may have steep backrest recline, and in extreme cases, may transition from an upright sitting position for taxi take-off and landing (TTOL) to a lie-flat sleeping position in-flight. Seats in private aircraft and business jets may have adjustability beyond that found in commercial aircraft, such as seat tracking in fore, aft and lateral directions, and swivel features.

Regardless of seating class, conventional seat constructions achieve seat pan tilt by pivoting a seat component (e.g., the seat frame or seat pan) about a pivot point through a linked mechanism. Such an arrangement limits the possibility of a steep seat pan angle and prevents any type of in-flight dynamic motion in the seat pan. The ability to achieve a steep seat pan angle would be desirable to realize new sitting positions such as a zero-G sitting position, while providing dynamic motion in the seat pan would be desirable to provide a more relaxing travel experience.

Accordingly, what is needed is a new seat construction capable of dynamic motion in-flight with the ability to lock-in a steep seat pan angle along the full range of motion of the seat pan. A desirable seat construction would further be robust and lightweight to be ideal for aircraft applications, and would be compatible for use with or without other adjustability features such as tracking, swivel, lie-flat and recline features.

SUMMARY OF THE INVENTIVE ASPECTS

To achieve the foregoing, the inventive aspects disclosed herein are directed to a passenger seat construction including a fixed frame including spaced frame members, a rocking frame including a seat pan supported between spaced rockers, the spaced rockers positioned to rock on portions of the fixed frame, and guides carried on the spaced rockers engaged to travel within slots of the spaced frame members to guide rocking motion of the rocking frame relative to the fixed frame.

In some embodiments, the passenger seat is an aircraft passenger seat, and wherein the rocking frame is lockable in a fixed position relative to the fixed frame during taxi, take-off and landing to prevent relative motion between the rocking frame and the fixed frame, and unlockable relative to the fixed frame in-flight to permit manual or automatic rocking motion of the rocking frame relative to the fixed frame.

In some embodiments, each spaced frame member of the spaced frame members defines a horizontal ledge positioned on an inner side of the spaced frame member, and wherein one of the spaced rockers is positioned to rock on the horizontal ledge.

In some embodiments, each of the spaced rockers has a bottom surface including a linear front portion transitioning into an arced rear portion, wherein when the linear front portion is engaged with the respective ledge the arced rear portion is out of engagement with the respective ledge and vice versa.

In some embodiments, the linear surfaces of the spaced rockers when engaged with the ledges corresponds to a taxi, take-off and landing compliant upright sitting position and/or a fully forward rocking position of the rocking frame.

In some embodiments, a seat pan angle relative to horizontal, inclined in a forward direction, increases as the rocking frame rocks backward and decreases as the rocking frame rocks forward, and wherein a maximum seat pan angle to horizontal is at least 25 degrees.

In some embodiments, the slots include at least one elongate arced slot positioned near a front end of each of the spaced frame members and at least one elongate arced slot positioned near a back end of each of the spaced frame members.

In some embodiments, the seat construction further includes a lock configured to lock the rocking frame relative to the fixed frame to prevent relative motion therebetween.

In some embodiments, the seat construction further includes at least one of a backrest and a leg rest pivotally-attached to the rocking frame and adjustable in angle relative to the rocking frame, and wherein rocking motion and berthing to lie flat are mutually exclusive features.

In some embodiments, the fixed frame is attachable to a seat adjustment mechanism capable of seat tracking and/or seat swivel.

In some embodiments, the seat construction further includes a damper coupled between the rocking frame and the fixed frame operable for dampening rocking motion of the rocking frame in at least one direction.

In another aspect, the inventive concepts disclosed herein are directed to an aircraft passenger seat construction capable of in-flight rocking motion and berthing, wherein rocking motion and berthing are mutually exclusive features, the aircraft passenger seat construction including a fixed frame including spaced frame members each having a support surface to be rocked on, a rocking frame including a seat pan and spaced rockers, the spaced rockers positioned to rock on the support surfaces, guides carried on the spaced rockers engaged to travel within guide slots of the spaced frame members, a backrest pivotally attached to the rocking frame, and a leg rest pivotally attached to the rocking frame.

In some embodiments, the rocking frame is lockable relative to the fixed frame during taxi, take-off and landing to prevent relative motion between the rocking frame and the fixed frame, and unlockable relative to the fixed frame in-flight to permit rocking motion of the rocking frame relative to the fixed frame.

In some embodiments, the backrest is pivotable to horizontal only when the rocking frame is locked relative to the fixed frame.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Aircraft passenger seat constructions are described in the following with reference to the drawing figures. The seat constructions advantageously provide sitting positions and dynamic motions that enhance comfort, and particularly, in-flight sitting comfort. In some embodiments, the aircraft seat mimics rocking chair motion such that the seat occupant can rock back-and-forth in-flight with a fluidic motion. In some embodiments, the seat constructions may have a low-profile track-and-swivel base to which a fixed frame is installed. The fixed frame may include horizontal or substantially horizontal ledges on which components of a rocking frame rocks. The rocking frame includes spaced rockers each having an arced bottom edge that engages on the horizontal ledges of the fixed frame to rock the seat back-and-forth in-flight.

Geometrically, a point on the circumference of a circle rolling on a planar surface traces a curve called a cycloid. As it relates to the seat construction, the rocking frame may roll (e.g., rock back-and-forth) on the horizontal ledges of the fixed frame, and hence any point on the rocking frame may be traceable to a cycloid. Two or more points may be selected on the rocking frame and the fixed frame may include elongate slots at those points, or vice versa. Rollers or like guides carried on the rocking frame roll or otherwise travel within the slots in the fixed frame to provide stability while controlling and limiting the rocking motion. In some embodiments, additional rollers may be added to the sides of the rocking frame for additional lateral stability. In some embodiments, the rockers may have a v-grooved bottom that rolls on a corresponding v-rail member on the ledges for further increased lateral stability.

The seat constructions may have a predetermined center of gravity location to customize the back-and-forth rocking motion. The rocking motion may take the seat from TTOL to an extreme position and back. The backrest may be independently pivotably attached to the rocking frame to change the backrest angle to recline the seat between an upright sitting position and a lie flat bed, as well as during rocking for a more comfortable sitting position. In some embodiments, backrest adjustment may be limited to a range of about, but not limited to, 15° to 20°. Additionally, seat motion may be stopped or locked at any given point along the full range of motion of the rocking frame based on passenger preference to achieve a desired sitting position. For example, a dedicated zero-G sitting position may be realized by locking the seat pan position near an extreme end or back of the rocking range where the seat pan angle is about, but not limited to, 25° to 30° from horizontal. In the zero-G sitting position, the backrest angle may be in the range of about, but not limited to, 120° to 135° to the seat pan. An optional leg rest may be pivotably attached to the rocking frame for further freedom to adjust leg rest angle relative to the seat pan as deemed comfortable. Furthermore, the seat may be locked at any position between the TTOL and fully rocked-back position to achieve a sitting position based on passenger preference. The seat construction may include manual rocking by the passenger or automated via a powered actuator, and rocking motion may be available in the entire range from TTOL to zero-G, for example. Depending on other adjustment mechanisms of the seat, such as tracking and swivel adjustment, the seat may be capable of rocking in any direction. Other adjustment mechanisms compatible with the rocker seat construction include, but are not limited to, height adjustment mechanisms for adjusting the vertical height of the seat.

One or more dampers may be utilized to dampen the rocking motion in at least one direction, as well as the directional-change motion at the extreme ends of the rocking motion to help cushion and absorb any abrupt stop. For example, a gas spring having a coil spring for force adjustment may be utilized to aid in the rocking motion based on, for example, passenger weight.

Referring to FIGS. 1-7, a non-limiting example of an aircraft passenger seat construction is shown generally at reference numeral 20. The passenger seat construction includes a fixed frame 22 treated as stationary in these descriptions relative to a rocking frame 24, but not necessarily relative to other structures such as seat adjustment mechanism and the aircraft deck. The fixed frame 22 supports and guides the rocking motion of the rocking frame 24 engaging the fixed frame. The fixed frame 22 is attachable directly to the floor or indirectly through a seat adjustment mechanism 26 such as an adjustment mechanism capable of one or more of tracking, height and swivel adjustment. The seat adjustment mechanism 26 may be coupled to legs 28 equipped with track fasteners 30 attachable to seat tracks located in the floor. Spaced frame members 32 of the fixed frame 22 extend vertically and are laterally positioned at the respective left and right sides of the seat, thereby providing lateral stability to the rocking frame 24.

The rocking frame 24 carries a seat pan 34, which may be positionally adjustable relative to the rocking frame, disposed between or on a pair of spaced rockers 36 that rock on the fixed frame 22 while supporting the seat pan. A backrest 38 is pivotally attached at one end to the rocking frame 24, such as pivotally attached to the aft ends of the spaced rockers 36. The backrest extends away from the rocking frame 24, such as substantially upward at an adjustable recline angle from a backrest pivot point 40 near the aft end of the rocking frame 24. A leg rest 42 is pivotally attached to the fore end of the rocking frame 24. The seat pan 34, the backrest 38, and the leg rest 42 travel with rocking motion of the rocking frame 24, but may each be independently adjustable with respect to the rocking frame for additional comfort and to achieve various sitting and sleeping positions. Each rocker 36 is positioned laterally inward its respective frame member 32 to provide a passenger-left rocker and passenger-right rocker.

Figure 4:
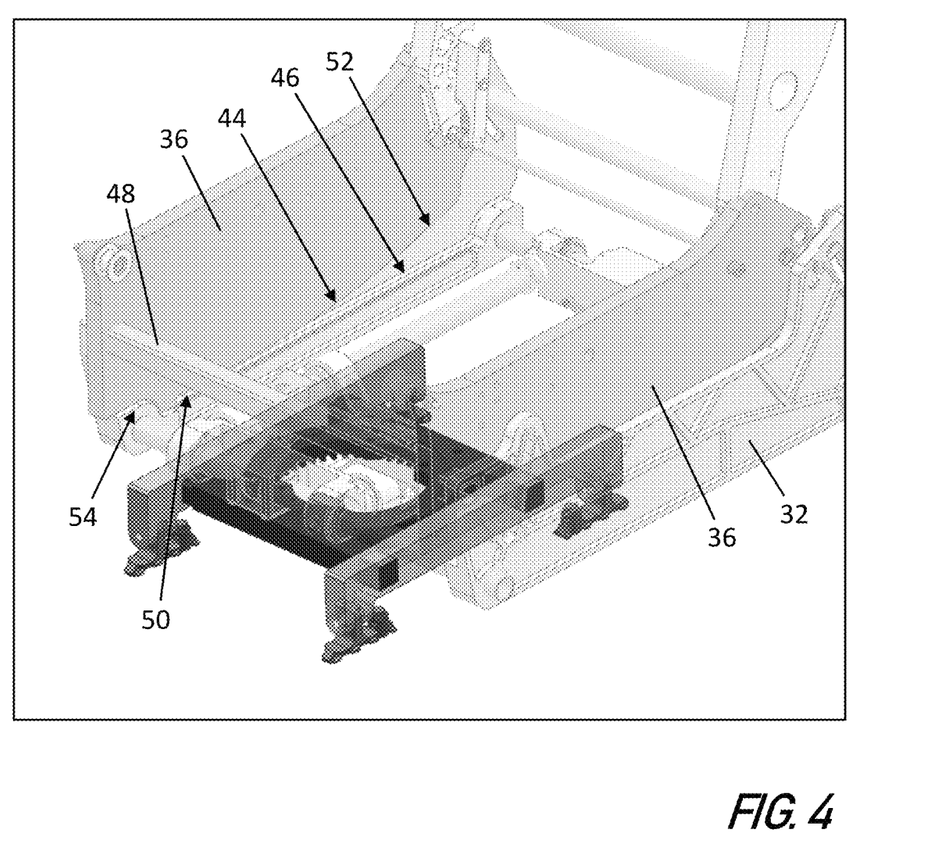
FIG. 4 is a front perspective view of a portion of the rocker seat construction showing the rocker seat in phantom and positioned atop a seat adjustment mechanism with tracking and swivel capabilities.

Each rocker 36 defines a bottom surface or edge 44 in contact with ledges 46 positioned along the inner sides of the frame members 32 (see FIG. 4). The ledges 46 may also be substituted for a platform continuous between the spaced frame members. The spaced rockers 36 may be stabilized and squareness therebetween maintained by a transverse interconnecting beam 48. The bottom edge 44 of each rocker 36 includes a linear front portion 50 and an arced rear portion 52, such that when each linear front portion 50 engages its respective ledge 46 each arced rear portion 52 is raised out of engagement with the respective ledge and vice versa. The linear portions 50 in full engagement with the ledges 46 may correspond to a taxi, take-off and landing compliant upright sitting position and/or a fully forward rocking position of the rocking frame 24. Each rocker 36 may further define a forwardmost portion along the bottom edge 44 that engages with a complimentary shaped portion 54 of its respective frame member 32 to prevent forward overtravel and help lock the rocking frame 24 in the TTOL compliant position.

Guides 56, 58 carried on the rockers 40 engage the frame members 32 to facilitate smooth rocking motion as fore guides 56 travel within fore cycloid slots 60 and aft guides 58 travel within the aft cycloid slots 62 defined in the spaced frame members to guide rocking motion of the rocking frame 24 relative to the fixed frame 22. The guides 56, 58, for example, can be rollers mounted on axle posts extending outward from the rockers 36 toward the respective slots. The fore cycloid slots 60 and aft cycloid slots 62 and corresponding guides are shown near the fore and aft ends end of the illustrated frame member 32 and rocker 36. Passenger-right fore and aft slots and guides and passenger-left fore and aft slots and guides are understood by symmetry.

In some embodiments, the slots described herein are cycloid slots, with reference and comparison to the curve traced by a point on the rim of a circle. The slots 60, 62 are shaped to conform to the natural movement arcs of the corresponding guides 56, 58 as the guides travel with rocking motion of the rocking frame 24. The slots can be defined by tracing or modeling the paths of selected points on the rockers 36 for guides to be placed.

Figure 1:
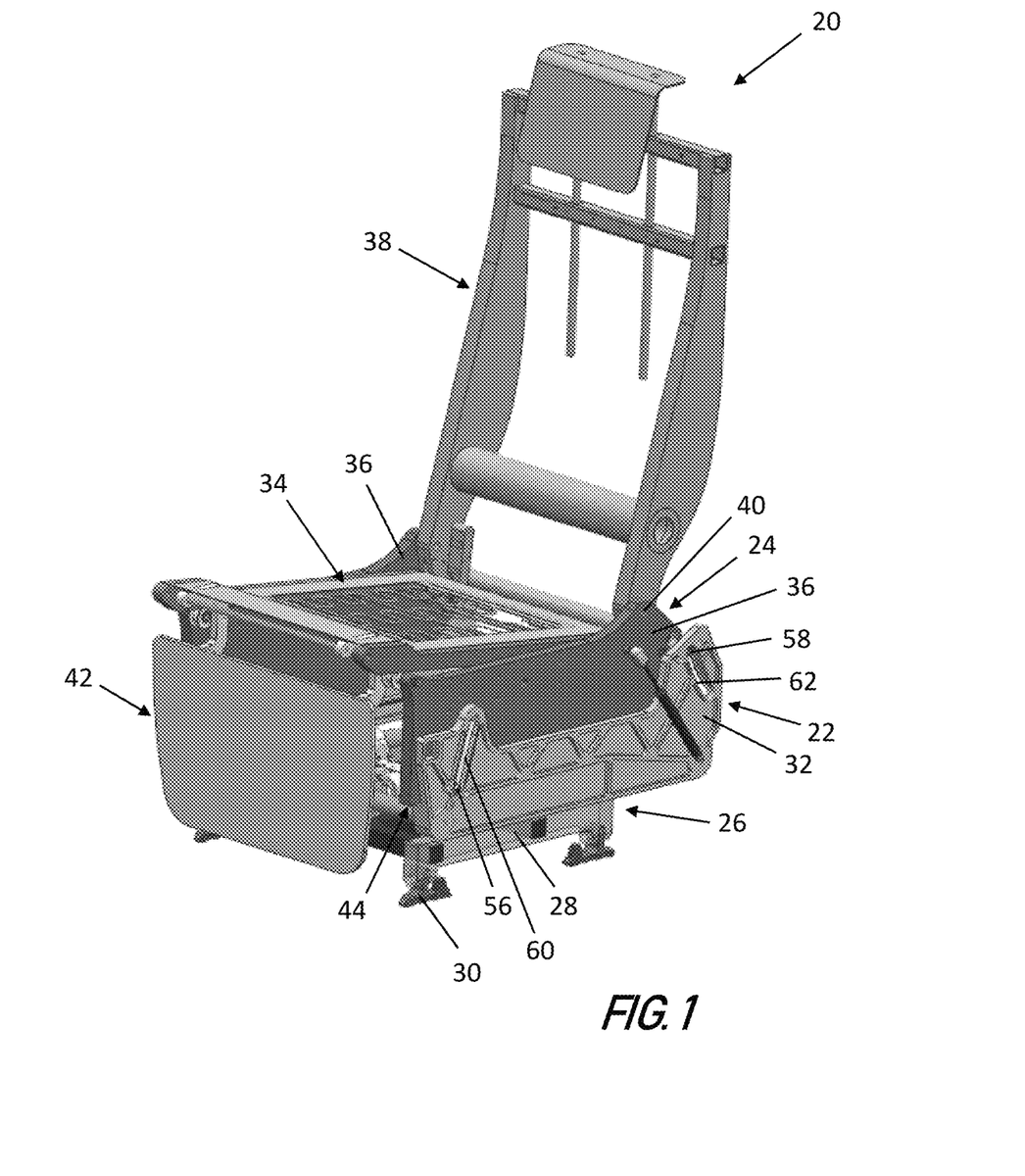
FIG. 1 is a front perspective view of a rocker seat construction including a rocking frame shown in a taxi, take-off and landing compliant position.
Figure 6:
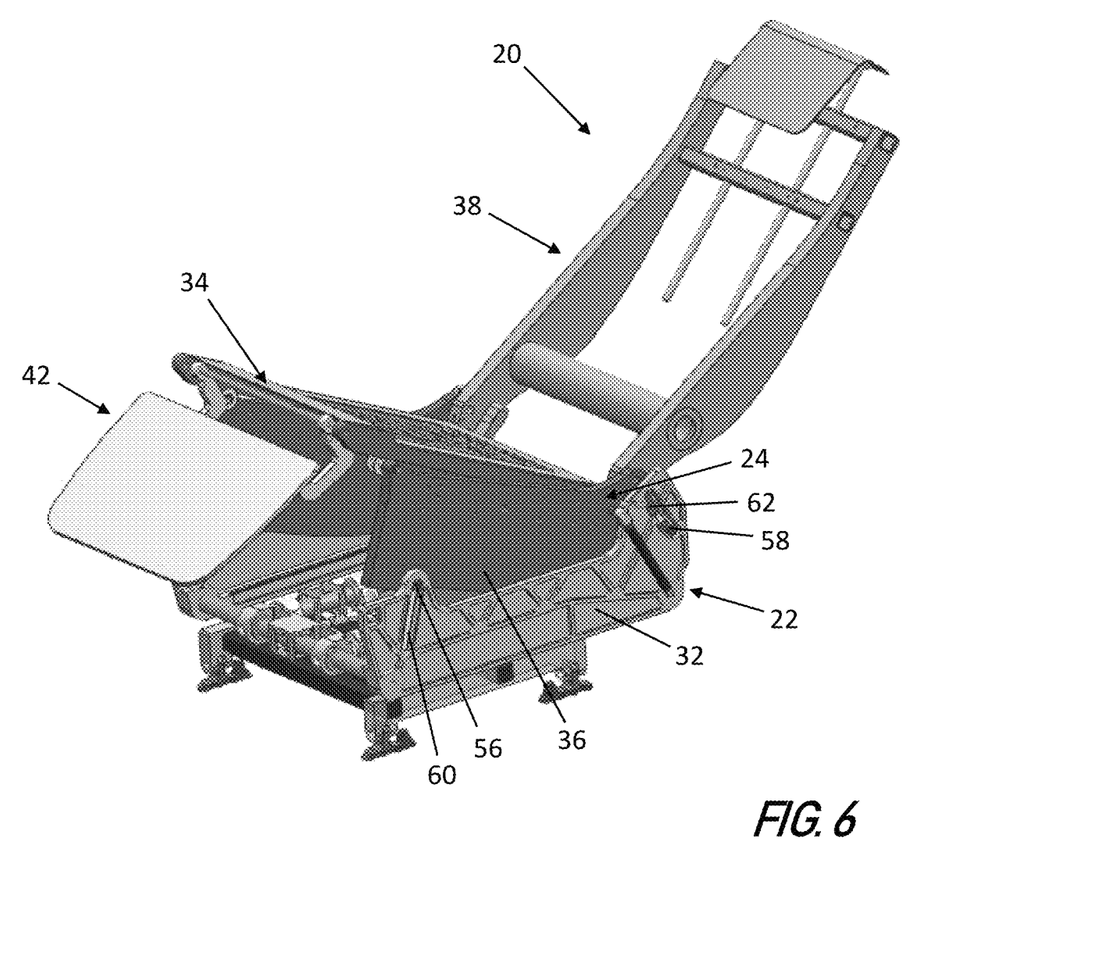
FIG. 6 is a front perspective view of the rocker seat construction showing the rocking frame in an extreme back or angled position.

Supported by the ledges 46 of the frame members 32 of the fixed frame 22, and guided by the cycloid slots 60, 62, the rockers 36 engage atop the ledges and can rock forward to the extreme forward position of FIG. 1 and rearward to the extreme back position of FIG. 6. In the extreme forward position of FIG. 1, the angle of the seat pan 34 is slightly inclined in a forward direction relative to a horizontal plane as represented by the floor. The angle of the seat pan 34 increases as the rocking frame 24 rocks backward and decreases as the rocking frame 24 rocks forward. A maximum seat pan angle (FIG. 6) relative to a horizontal plane is at least 20 degrees in some embodiments. In the illustrated embodiment, in the extreme forward position of FIG. 1, the fore guides 56 approach or reach the lower ends of the fore cycloid slots 60 and the aft guides 58 approach or reach the upper ends of the aft cycloid slots 62. In the extreme back position of FIG. 6, the fore guides 56 approach or reach the upper ends of the fore cycloid slots 60 and the aft guides 58 approach or reach the lower ends of the aft cycloid slots 62. Thus, the guides and cycloid slots limit the movement of the rocking frame 24 to a predetermined range in the illustrated embodiment.

Figure 2:
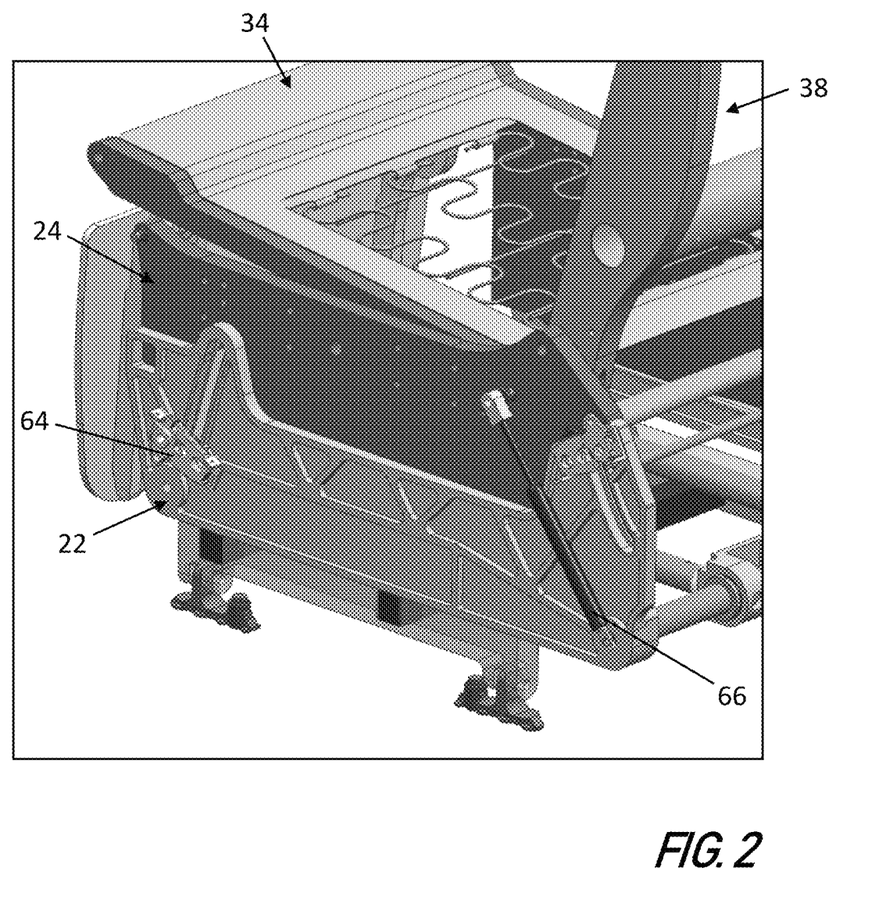
FIG. 2 is a side perspective view of a portion of the rocker seat shown in a forward position for taxi-take-off and landing.

In the embodiment shown in FIG. 2, the rocking frame 24 is lockable relative to the fixed frame 22 during taxi, take-off and landing to prevent relative motion between the rocking frame and the fixed frame 22, and unlockable relative to the fixed frame 22 in-flight to allow rocking motion of the rocking frame 24 relative to the fixed frame 22. For example, a lock 64 can engage (lock) when the rocking frame 24 reaches the extreme forward position, automatically or under manual control or selection, to prevent relative motion between the rocking frame 24 and the fixed frame 22 until the lock is disengaged (unlocked).

In the embodiment shown in FIG. 2, a damper 66 can be coupled between the rocking frame 24 and the fixed frame 22 operable for dampening rocking motion of the rocking frame in at least one direction. The damper 66 can damp the rocking motion in one rocking direction, or both. The damper 66 can cushion and abrupt stops and absorb their impact forces, for example, as the guides approach the ends of their slots. For example, the damper 66 can include a gas spring and a coil spring for force adjustment. The damper may be utilized to aid in the rocking motion based on, for example, passenger weight.

Figure 3:
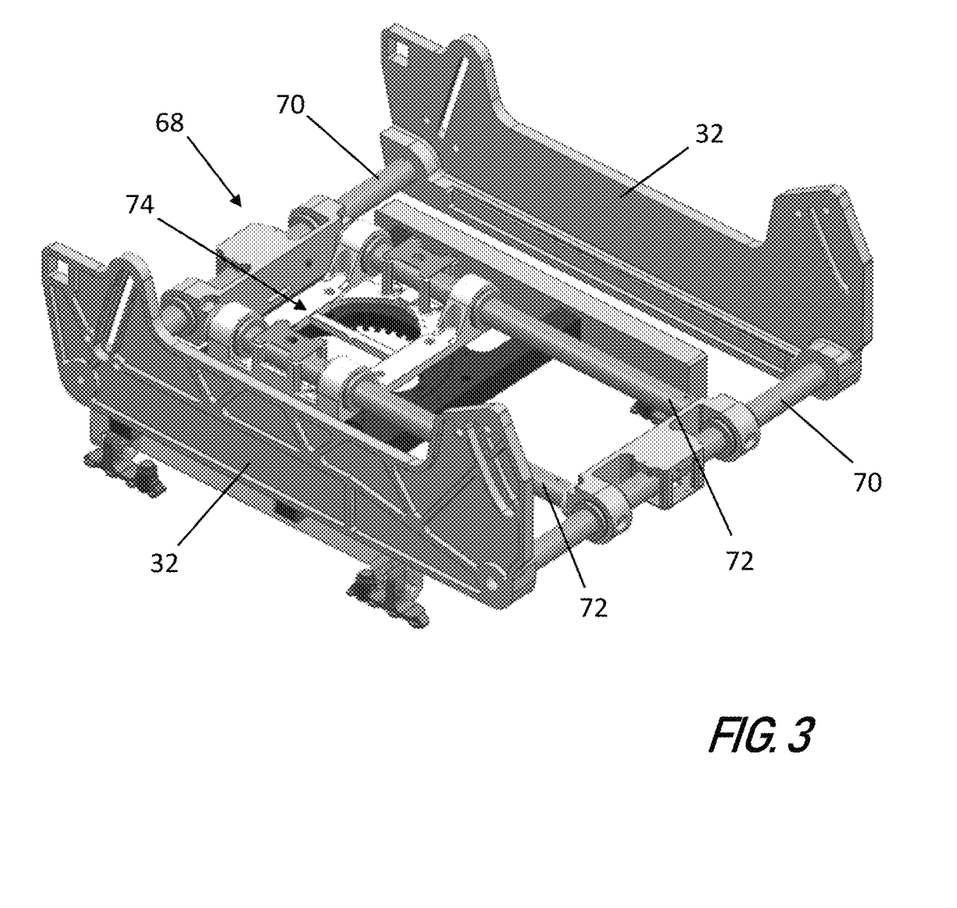
FIG. 3 is a front perspective view of the fixed frame assembly of the rocker seat construction shown positioned atop a seat adjustment mechanism.

In the embodiment shown in FIG. 3, the seat construction may be coupled to an adjustment mechanism such as a track and swivel adjustment mechanism 68 capable of providing at least one of seat tracking in at least one direction and swivel adjustment. The spaced frame members 32 of the fixed frame may be interconnected by fore and aft transverse beams 70. The transverse beams 70 may be coupled to longitudinal beams 72 of a slide assembly. Fore and aft seat tracking or lateral seat tracking may be actuator driven. In some embodiments, the swivel assembly 74 may be a low-profile swivel assembly generally including a pair of transversely spaced-apart base rails each including fore and aft fittings for connecting the base rails to other structure, the base rails defining a transversely-extending horizontal plane extending therebetween. The swivel assembly 74 may be mounted between the pair of base rails in the laterally-extending horizontal plane, the swivel assembly allowing a low-profile seat with a spar that forms a part of the swivel assembly and transfers loads from the seat efficiently to the aircraft deck. The slide assembly enables the seat to slide fore and aft or side-to-side independent of the rotation of the seat on the swivel assembly.

Figure 5:
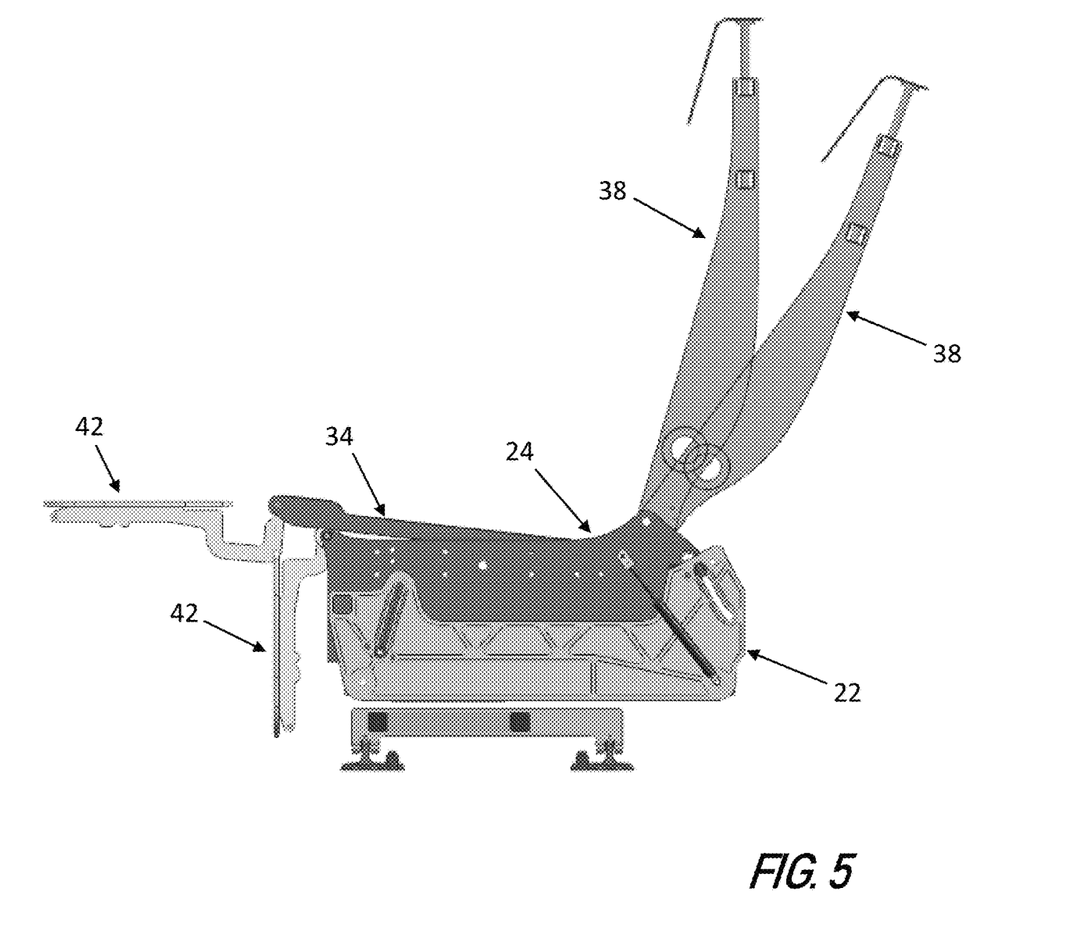
FIG. 5 is a side elevation view of the rocker seat construction showing the rocking frame in a forward position and various achievable positions of each of the backrest and the leg rest.
Figure 7:
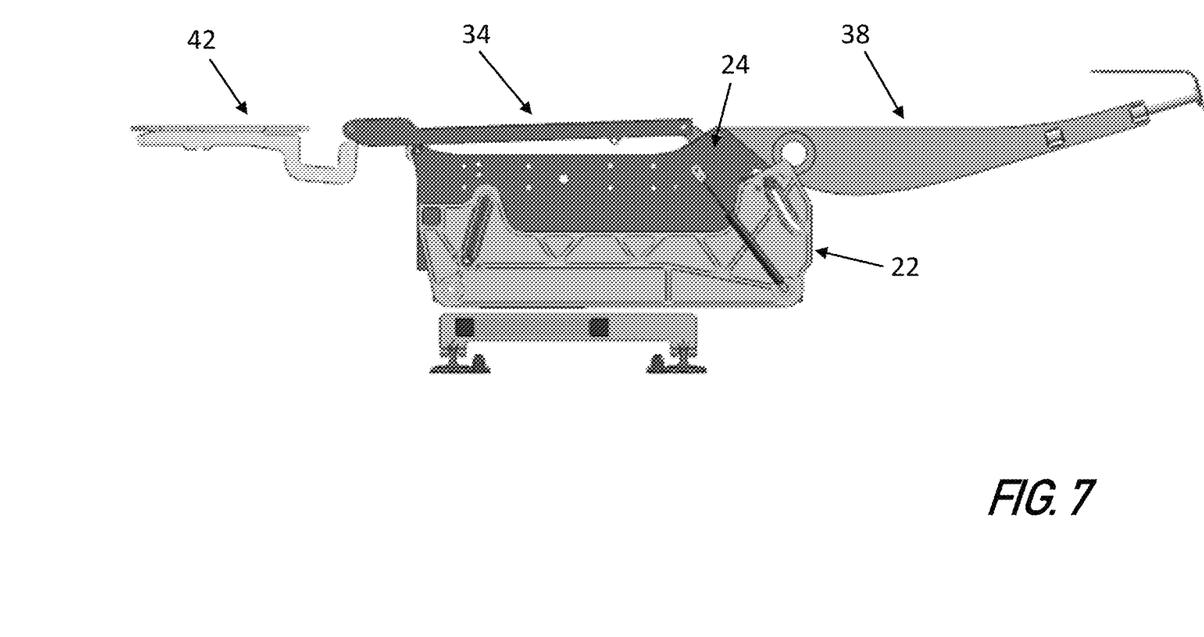
FIG. 7 is a side elevation view of the rocker seat construction showing rocking frame in a forward position, the backrest fully reclined and the leg rest fully extended to form a lie flat bed.

As represented in FIG. 4, the backrest 38 extends from the aft end of the rocking frame 24 at an adjustable recline angle. Similarly, the leg rest 42 is attached to the fore end of the rocking frame at an adjustable recline angle. With the backrest 38 reclined relative to the rocking frame and seat pan 34, and the leg rest 42 raised, a passenger can rest in comfort in a zero-G sitting position, which may be realized by locking the seat pan position by locking the rocking frame relative to the fixed frame 22, for example using the lock. As represented in FIG. 5, various backrest 38 and leg rest 42 angles are achievable. As represented in FIG. 7, a full lie flat sleeping position is achievable by locking the rocking frame 24 is the full forward position, reclining the backrest 38 fully, and raising the leg rest 42 fully.

The rockers 36 of the rocking frame 24 are positioned between the frame members 32 of the fixed frame 22, each rocker 36 laterally adjacent a respective frame member 32 providing lateral stability to the rocking frame 24. In some embodiments, the bottom surface of each rocker 36, from the linear front portion to the arced rear portion, may have a v-groove that receives and rides on a corresponding v-rail member on a ledge, further assuring lateral stability and positioning of the rocking frame.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A passenger seat construction, comprising:
a fixed frame including spaced frame members, wherein slots are provided on the spaced frame members;
a rocking frame including a backrest and a seat pan supported on spaced rockers, the spaced rockers positioned to rock on portions of the fixed frame; and
guides carried on the spaced rockers engaged to travel within the slots of the spaced frame members to guide rocking motion of the rocking frame relative to the fixed frame;
wherein the passenger seat construction is adjustable between a sitting position and a berthing position, and the passenger seat construction is configured for the rocking motion only when in the sitting position.

2. The passenger seat construction of claim 1, wherein the passenger seat is an aircraft passenger seat, and wherein the rocking frame is lockable in a fixed position relative to the fixed frame during taxi, take-off and landing to prevent relative motion between the rocking frame and the fixed frame, and unlockable relative to the fixed frame in-flight to permit manual or automatic rocking motion of the rocking frame relative to the fixed frame.

3. The passenger seat construction of claim 1, wherein each spaced frame member of the spaced frame members defines a horizontal ledge positioned on an inner side of the spaced frame member, and wherein one of the spaced rockers is positioned to rock on the horizontal ledge.

4. The passenger seat construction of claim 3, wherein each of the spaced rockers has a bottom surface including a linear front portion transitioning into an arced rear portion, wherein when the linear front portion is engaged with the respective ledge the arced rear portion is out of engagement with the respective ledge and vice versa.

5. The passenger seat construction of claim 4, wherein the linear surfaces of the spaced rockers when engaged with the ledges corresponds to a taxi, take-off and landing compliant upright sitting position and/or a fully forward rocking position of the rocking frame.

6. The passenger seat construction of claim 1, wherein a seat pan angle relative to horizontal, inclined in a forward direction, increases as the rocking frame rocks backward and decreases as the rocking frame rocks forward, and wherein a maximum seat pan angle to horizontal is at least 25 degrees.

7. The passenger seat construction of claim 1, wherein the slots include at least one elongate arced slot positioned near a front end of each of the spaced frame members and at least one elongate arced slot positioned near a back end of each of the spaced frame members.

8. The passenger seat construction of claim 1, further comprising a lock configured to lock the rocking frame relative to the fixed frame to prevent relative motion therebetween.

9. The passenger seat construction of claim 1, further comprising a leg rest pivotally-attached to the rocking frame and adjustable in angle relative to the rocking frame, and wherein rocking motion and berthing to lie flat are mutually exclusive features.

10. The passenger seat construction of claim 1, wherein the fixed frame is attachable to a seat adjustment mechanism capable of seat tracking and/or seat swivel.

11. The passenger seat construction of claim 1, further comprising a damper coupled between the rocking frame and the fixed frame operable for dampening rocking motion of the rocking frame in at least one direction.

12. An aircraft passenger seat construction capable of in-flight rocking motion and berthing, wherein rocking motion and berthing are mutually exclusive features, the aircraft passenger seat construction comprising:
a fixed frame including spaced frame members each having a support surface to be rocked on, wherein guide slots are provided on the spaced frame members;
a rocking frame including a seat pan and spaced rockers, the spaced rockers positioned to rock on the support surfaces;
guides carried on the spaced rockers engaged to travel within the guide slots of the spaced frame members;
a backrest pivotally attached to the rocking frame; and
a leg rest pivotally attached to the rocking frame,
wherein the backrest is pivotable to horizontal only when the rocking frame is locked relative to the fixed frame.

13. The aircraft passenger seat of claim 12, wherein the rocking frame is lockable relative to the fixed frame during taxi, take-off and landing to prevent relative motion between the rocking frame and the fixed frame, and unlockable relative to the fixed frame in-flight to permit rocking motion of the rocking frame relative to the fixed frame.

14. The aircraft passenger seat of claim 12, wherein each of the spaced rockers has a bottom including a linear front portion and an arced rear portion, wherein when the linear front portion engages the support surface the arced rear portion is out of engagement with the support surface and vice versa, and wherein the linear front portion when engaged with the support surface and the rocker frame when locked relative to the fixed frame corresponds to an upright sitting position compliant for taxi, take-off and landing.

15. The aircraft passenger seat of claim 12, wherein a seat pan angle relative to horizontal, inclined in a forward direction, increases as the rocking frame rocks backward and decreases as the rocking frame rocks forward, and wherein a maximum seat pan angle to horizontal is at least 25 degrees.

16. The aircraft passenger seat of claim 12, wherein the guide slots include elongate arced slots positioned near front ends of the spaced frame members and elongate arced slots positioned near back ends of the spaced frame members.

17. The aircraft passenger seat of claim 12, further comprising a lock mechanism configured to lock the rocking frame relative to the fixed frame to prevent relative motion therebetween, and wherein the rocking frame is lockable at any position along a full range of motion of the rocking frame.

18. The aircraft passenger seat of claim 12, further comprising a damper coupled between the rocking frame and the fixed frame operable for damping rocking motion of the rocking frame in at least one direction.

\* \* \* \* \*